US010293371B2

(12) United States Patent
Haack et al.

(10) Patent No.: US 10,293,371 B2
(45) Date of Patent: May 21, 2019

(54) ASSEMBLY AND METHOD OF PRETREATING LOCALIZED AREAS OF PARTS FOR JOINING

(71) Applicant: FORD GLOBAL TECHNOLOGIES, LLC, Dearborn, MI (US)

(72) Inventors: Larry Paul Haack, Ann Arbor, MI (US); Kimberly Ann Lazarz, Ypsilanti, MI (US); Ann Marie Straccia, Southgate, MI (US); Joy Hines Forsmark, St. Clair Shores, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

(21) Appl. No.: 15/285,244

(22) Filed: Oct. 4, 2016

(65) Prior Publication Data

US 2017/0021389 A1    Jan. 26, 2017

Related U.S. Application Data

(62) Division of application No. 14/222,555, filed on Mar. 21, 2014, now Pat. No. 9,486,957.

(51) Int. Cl.
*B05D 3/14* (2006.01)
*B29C 65/60* (2006.01)
(Continued)

(52) U.S. Cl.
CPC ............... *B05D 3/142* (2013.01); *B05D 1/62* (2013.01); *B05D 7/14* (2013.01); *B21J 15/025* (2013.01);
(Continued)

(58) Field of Classification Search
CPC ... B05D 3/142; B05D 1/62; B05D 7/14; B21J 15/025; B23K 11/0066; B29C 65/60; B32B 7/12; B32B 15/01; B32B 37/1284
See application file for complete search history.

(56) References Cited

U.S. PATENT DOCUMENTS 8,361,565 B2    1/2013  Kuhlenschmidt et al.
8,414,087 B2    4/2013  Wibbeke et al.
(Continued)

FOREIGN PATENT DOCUMENTS

DE    102009052088 A1    5/2011
JP    2007229980 A  *  9/2007  ............. B29C 65/48
(Continued)

OTHER PUBLICATIONS

Machine Translation of JP-2007229980-A (Year: 2007).*
(Continued)

*Primary Examiner* — Daniel McNally
(74) *Attorney, Agent, or Firm* — Raymond L. Coppielle; Brooks Kushman P.C.

(57) ABSTRACT

An assembly and a method of joining a first part with a second part at an attachment area that includes a localized area on the first part. The localized area is cleaned and activated by a plasma jet. An organosilicon composition is applied by plasma-enhanced chemical vapor deposition to the localized area. An adhesive is applied to the localized area and the second part is mechanically fastened to the first part in the localized area.

5 Claims, 6 Drawing Sheets

(51) Int. Cl.
- *B23K 11/00* (2006.01)
- *B21J 15/02* (2006.01)
- *F16B 11/00* (2006.01)
- *F16B 5/04* (2006.01)
- *F16B 19/08* (2006.01)
- *B05D 1/00* (2006.01)
- *B05D 7/14* (2006.01)
- *B32B 7/12* (2006.01)
- *B32B 15/01* (2006.01)
- *B32B 37/12* (2006.01)
- *C23G 5/00* (2006.01)

(52) U.S. Cl.
CPC .......... *B23K 11/0066* (2013.01); *B29C 65/60* (2013.01); *B32B 7/12* (2013.01); *B32B 15/01* (2013.01); *B32B 37/1284* (2013.01); *C23G 5/00* (2013.01); *F16B 5/04* (2013.01); *F16B 11/006* (2013.01); *F16B 19/086* (2013.01); *B32B 2383/00* (2013.01); *B32B 2605/00* (2013.01); *Y10T 156/10* (2015.01); *Y10T 428/249923* (2015.04)

(56) References Cited

U.S. PATENT DOCUMENTS

| | | |
|---|---|---|
| 8,672,384 B2 | 3/2014 | Fuchs et al. |
| 8,702,892 B2 | 4/2014 | Arber et al. |
| 2007/0026254 A1 | 2/2007 | Ben-Malek et al. |
| 2010/0015358 A1 | 1/2010 | Cernak et al. |
| 2011/0111236 A1 | 5/2011 | Pahl et al. |

FOREIGN PATENT DOCUMENTS

| | | | | |
|---|---|---|---|---|
| KR | 20050121940 A | * | 12/2005 | ......... H01L 51/5243 |
| WO | WO2012066096 A1 | | 5/2012 | |

OTHER PUBLICATIONS

Machine Translation of KR-20050121940-A (Year: 2005).*
DIPL.-ING. Christian Buske, "Environmentally Friendly and Cost-Saving Atmospheric-Pressure Plasma Technology", ATZ Produktion Worldwide, Publication Date: Apr. 2009, vol. 2, Issue 2, pp. 18-22; Springer Automotive Media.
Uwe Lommatzch, Dirk Pasedag, Alfred Baalmann, Guido Ellinghorst and Hans-Erich Wagner, "Atmospheric Pressure Plasma Jet Treatment of Polyethylene Surfaces for Adhesion Improvement", Plasma Process and Polymers, Publication Date: 2007, vol. 4, pp. S1041-S1045.
"Plasma-Enhanced Chemical Vapor Deposition", Wikipedia, the free encyclopedia; Printed Jan. 27, 2014, pp. 1-3; http://en.wikipedia.org/wiki/Plasma-enhanced_chemical_vapor-deposition.
"Atmospheric-Pressure Plasma", Wikipedia, the free encyclopedia; Printed Jan. 27, 2014, pp. 1-3; http//en.wikipedia.org/wiki/Atmospheric-pressure_plasma.
Hexamethyldisiloxane—Wikipedia, the free encyclopedia; Printed Jan. 27, 2014; pp. 1-3; http://en.wikipedia.org/wiki/Hexamethyldisiloxane.

* cited by examiner

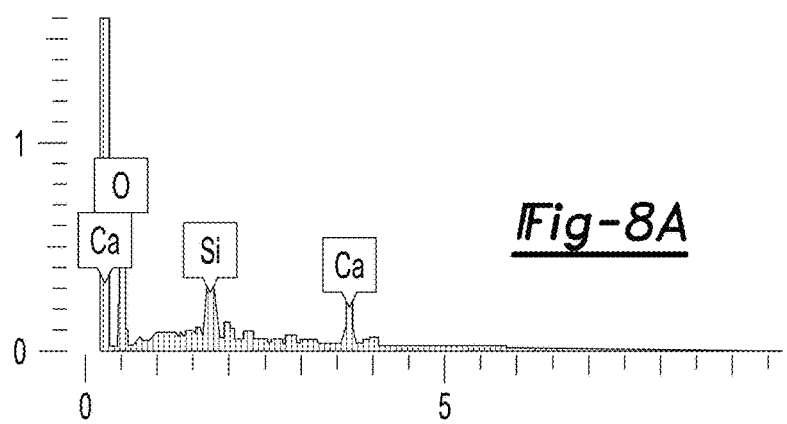
*Fig-8A*
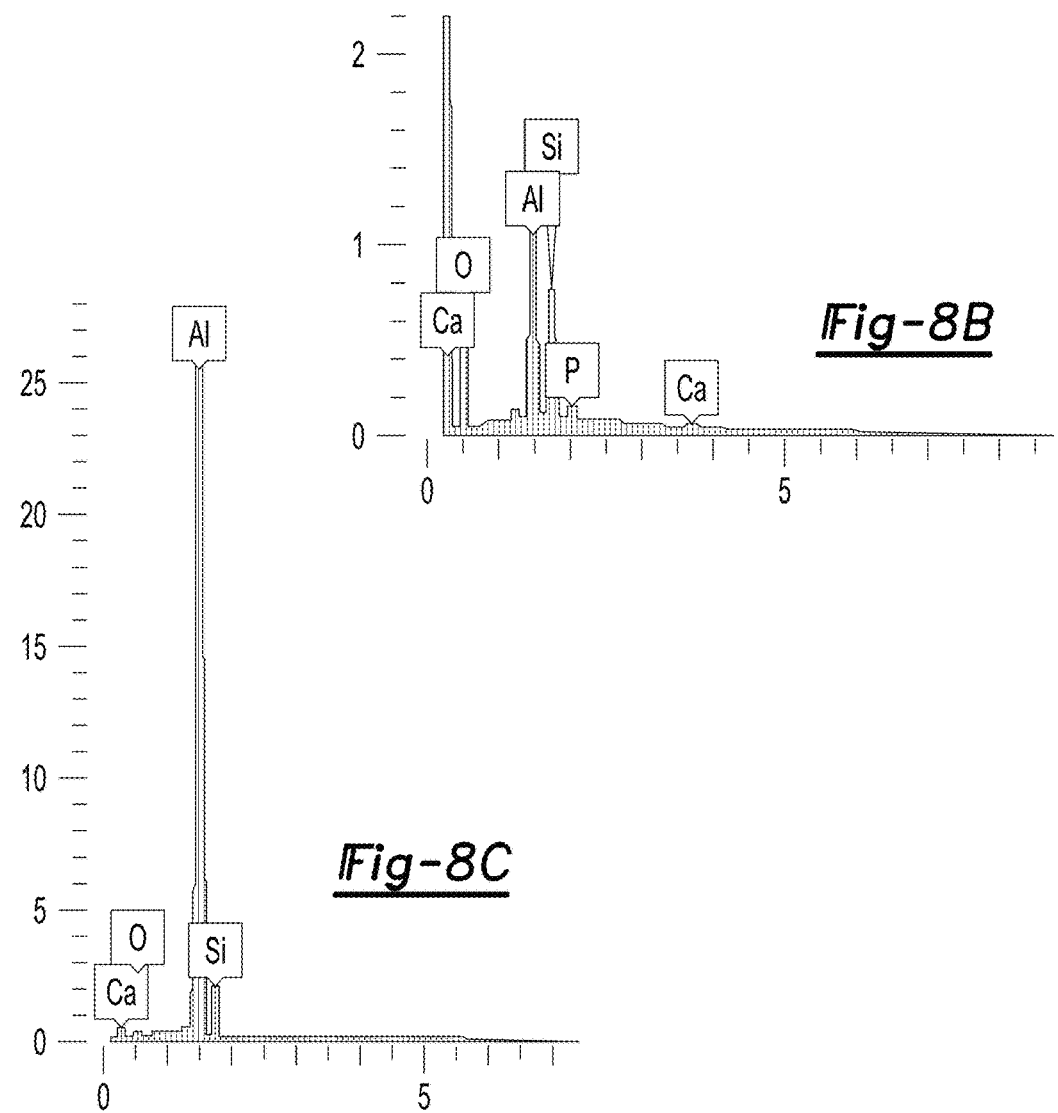
*Fig-8B*
*Fig-8C*

ASSEMBLY AND METHOD OF PRETREATING LOCALIZED AREAS OF PARTS FOR JOINING

CROSS-REFERENCE TO RELATED APPLICATIONS

This application is a division of U.S. application Ser. No. 14/222,555 filed Mar. 21, 2014, the disclosure of which is hereby incorporated in its entirety by reference herein.

TECHNICAL FIELD

The present disclosure relates to methods of joining parts together, particularly methods that include pretreating localized areas of at least one of the parts to be joined.

BACKGROUND

Components made of different lightweight materials, such as aluminum, magnesium, and composites are used to produce fuel efficient vehicles. Components made of lightweight materials may be cast or extruded at an automotive facility. Components made of lightweight materials may be required to be shipped to a secondary facility for surface pretreatment to improve adhesion of adhesives, coatings and paint.

Surface pretreatment may be a complex multi-step process that includes acid cleaning the component, applying a conditioning agent to the component, applying conversion coating that inhibits corrosion and increases adhesion and durability of paints and finishes. Additional post-forming treatments may be performed to further increase paint adhesion and corrosion resistance. The components may have complex shapes that make it difficult for the surface pretreatment process to uniformly pretreat the whole structure.

The components made of lightweight materials may be delivered to a vehicle assembly facility for the joining operations after undergoing surface pretreatment. The components may be joined together by welding or by self-piercing rivets. Adhesives may be applied to the pretreated components to improve the strength of connections between the components made of lightweight materials and other parts. Surface treatment processes described above increase manufacturing costs, are time-consuming, and the process may require the use of multiple facilities.

The above problems and other problems are addressed by this disclosure as summarized below.

SUMMARY

The present disclosure relates to an assembly and a method that includes the step of cleaning and activating a portion of a first metal component by applying plasma to the portion. A precursor gas of an organosilicon compound is combined with plasma to generate a thin film polymer coating. The polymer coating is applied to the cleaned and activated portion to create a coated portion of the first metal component. An adhesive is applied to the coated portion where a second metal component is fastened to the first metal component. The coating enhances the bond strength of the adhesive that adheres to the thin film polymer coating. The step of fastening may include riveting the two components together with a self-piercing rivet, a clinch joint, or a threaded fastener.

According to one aspect of this disclosure, an assembly method is disclosed that comprises applying atmospheric pressure plasma to a first part to clean and activate a localized area. An organosilicon composition is applied by plasma-enhanced vapor deposition to the localized area to create a thin film coating on the area. An adhesive is applied to the film coating at the localized area and a second part is mechanically fastened to the first part at the localized area.

According to other aspects of the method, the organosilicon compound may be hexamethyldisiloxane. The step of applying the hexamethyldisiloxane may include introducing the hexamethyldisiloxane as a precursor gas through a precursor gas inlet to be combined with the plasma. The adhesive bond to the thin film coating may be enhanced by exposed —OH groups. The step of joining the second part mechanically to the first part may include riveting the parts together with a self-piercing rivet.

According to another aspect of this disclosure, a method is provided for joining a first part to a second part. The method comprises identifying a localized area on the first part to be attached to the second part. A plasma jet is directed toward the first part to activate the surface of the localized area. A thin film coating is applied to the localized area and an adhesive is applied to the film coating at the localized area. The second part is fastened with a mechanical connection to the first part within the localized area.

According to other aspects of the method of joining a first and second part, the coating may be an organosilicon compound and the step of applying a film coating may further comprise depositing the organosilicon compound as a plasma-enhanced chemical vapor deposition. The organosilicon compound may be hexamethyldisiloxane.

According to another aspect of this disclosure, an assembly is disclosed that includes a first part that has a plasma-enhanced vapor deposition film coating of an organosilicon composition. A layer of adhesive is applied to the film coating and a second part is assembled to the first part. A mechanical joint connects the first part to the second part with the film coating and layer of adhesive disposed between the first part and the second part.

According to other aspects of this disclosure as it relates to the assembly, the plasma-enhanced vapor deposition film coating may be a hexamethyldisiloxane film. The hexamethyldisiloxane film may include exposed —OH groups that bond with the layer of adhesive. The mechanical joint may be a self-piercing rivet.

According to other aspects of the assembly, the plasma-enhanced vapor deposition film coating may be applied to a localized area on the first part. Alternatively, the plasma-enhanced vapor deposition film coating may be applied to localized areas on the first part and the second part, and the layer of adhesive may bond to the film coating on the first part and the second part.

The above aspects and other aspects of this disclosure are described in greater detail below with reference to the attached drawings.

BRIEF DESCRIPTION OF THE DRAWINGS

FIGS. 8A-8C are spectrogram of Spectrums 20-22 in FIG. 8.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

The metal parts described in this disclosure may be alternative parts formed of different metals or composite materials. The metal components may also be made by casting, extrusion, sheet metal forming, or other processes. Examples of assemblies that may be made with the disclosed method include, but are not limited to, shock tower assemblies, rail/sledge runner transitions, front ends, and other automotive body structures.

Figure 1:
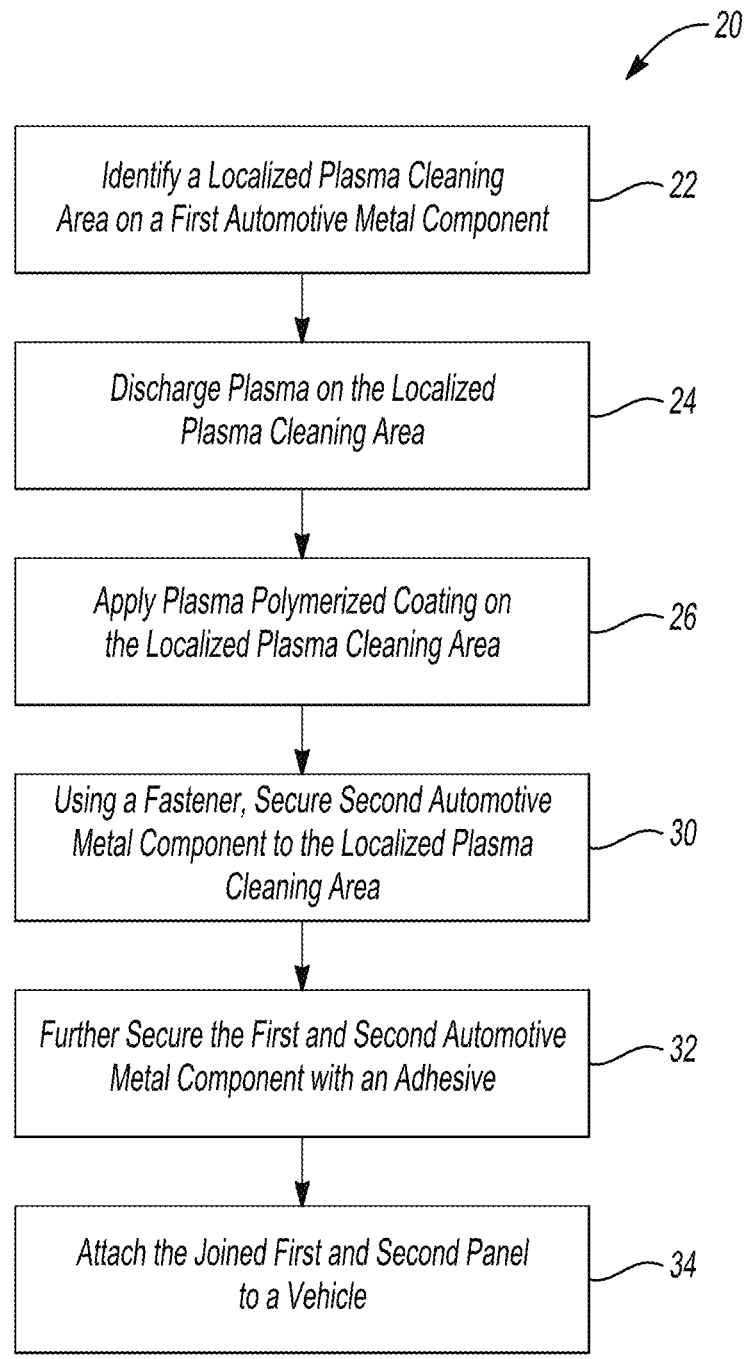
FIG. 1 is a flowchart showing a method of joining metal components together.

Referring to FIG. 1, flowchart 20 shows the steps of a method of assembling component parts of a vehicle. At step 22, one or more localized areas are identified on a first part that is to be assembled to a second part. As used herein, the term "localized area" should be interpreted as less than 25% of the surface area of the part. At step 24, atmospheric pressure plasma is directed to the localized areas to clean the areas to activate and clean the surface of the part. Cleaning and activating the localized areas improves bonding with paints, coatings, or adhesives applied to the parts in the localized areas. At step 26, a pretreatment coating, for example an organosilicon compound, is applied to the localized areas by plasma enhanced chemical vapor deposition. The pretreatment coating may be formed by combining a precursor gas with plasma. The precursor gas may be a gaseous form of hexamethyldisiloxane ("HMDSO"). After reacting chemically with plasma, the HMDSO becomes a plasma-polymerized silane coating that serves as an adhesion promoter for adhesive bonding and may add local corrosion protection. At step 28, an adhesive is applied to the localized areas. At step 30, a second part is mechanically attached to the first part at the localized areas to mechanically fasten the second part to the first part with self-piercing rivets, clinch joints or threaded fasteners. At step 34, the joined parts are assembled to the vehicle.

Figure 2:
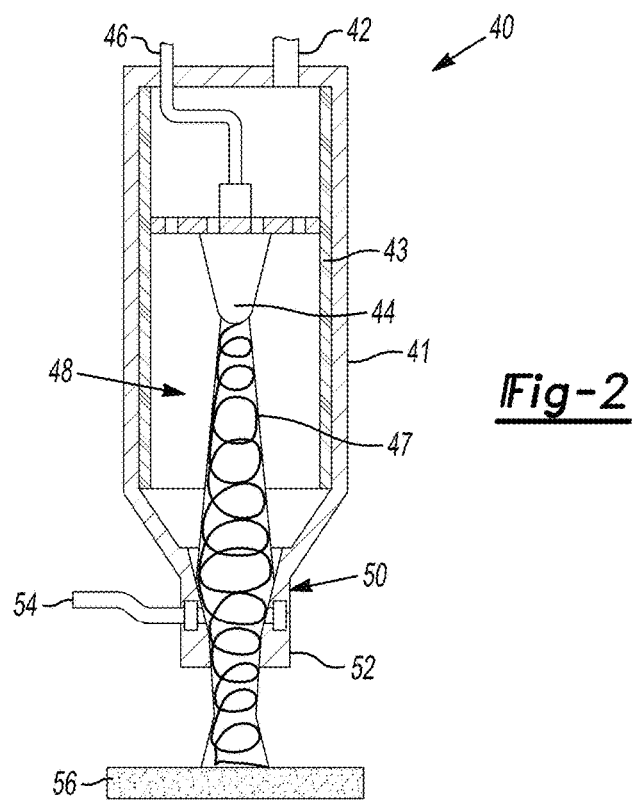
FIG. 2 is a front schematic cross-sectional view of a plasma generator that may be used in the method of FIG. 1.

Referring to FIG. 2, a plasma generator 40 is diagrammatically illustrated that may be used to discharge plasma in steps 24 and 26 of the method of FIG. 1. The plasma generator 40 includes a housing 42 having an insulation layer 43. The housing receives a process gas, for example, compressed air, through a gas inlet 42. A voltage supply 46 is connected to a high voltage source to generate an electric arc. An electrode 44 disposed in the housing 41 is connected to the high voltage supply 46. Compressed air is continuously injected through the gas inlet 42 and is ionized by the electric arc created by the electrode 44 to produce plasma 47. The plasma 47 is directed to a discharge area 48 of the housing 41 where the plasma rotates at high potential. The housing 41 defines a plasma nozzle 50 that directs the plasma jet toward a desired treatment location. A precursor gas inlet 54 is provided that opens into the plasma nozzle 50.

The precursor gas inlet 54 is closed when the localized plasma cleaning area is cleaned at step 24. The plasma nozzle 50 directs plasma 47 toward the part and activates and cleans the surface of the part 56 in the localized area. The cleaned and activated surface promotes adhesion of coatings, adhesives and paints.

At step 26, the precursor gas inlet 54 is opened and precursor gas, such as HMDSO, reacts with the plasma 47 to form a polymerized silane coating. The polymerized silane coating is discharged through the nozzle 50 and is directed to the localized area of the part 56. The polymerized silane coating forms a thin film on the part 56. Adhesives used in the joining process durably bond to the film. The film may also serve as an anti-corrosion coating.

Figure 3:
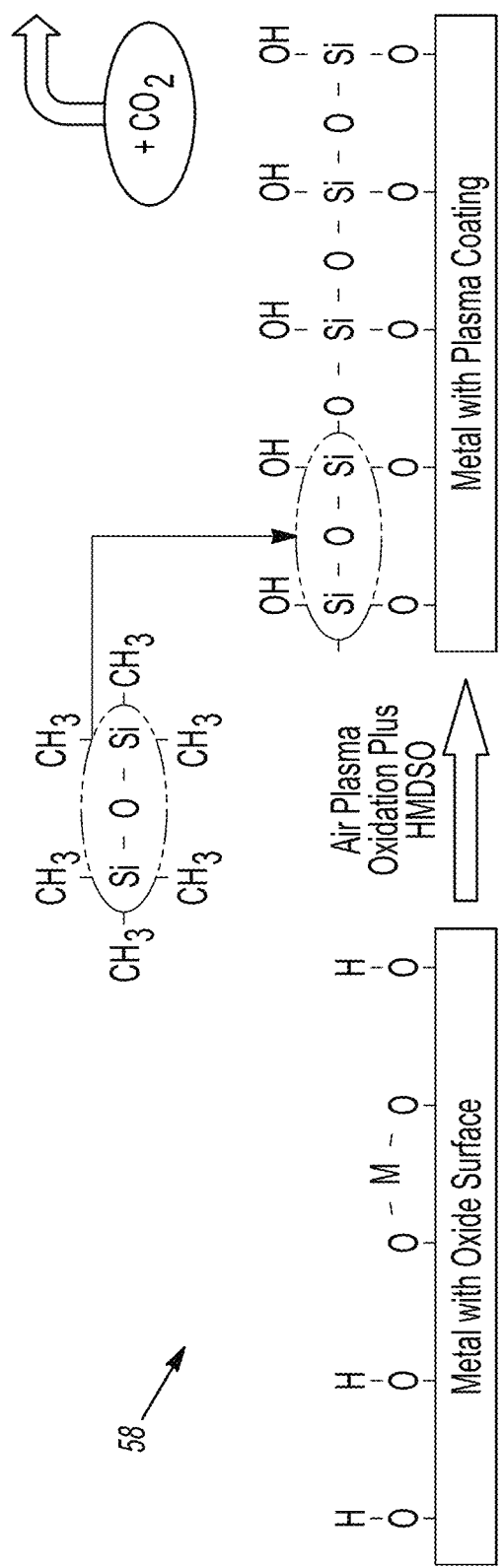
FIG. 3 is an illustration of a chemical transformation occurring on a surface of a metal component when executing the steps of the method of FIG. 1.

Referring to FIG. 3, a diagram 58 is provided of the chemical reaction between the HMDSO and plasma. The thin film of polymerized silane coating has highly reactive exposed —OH groups 49 that promote bonding with the adhesives or coatings that are applied to the film.

Figure 4:
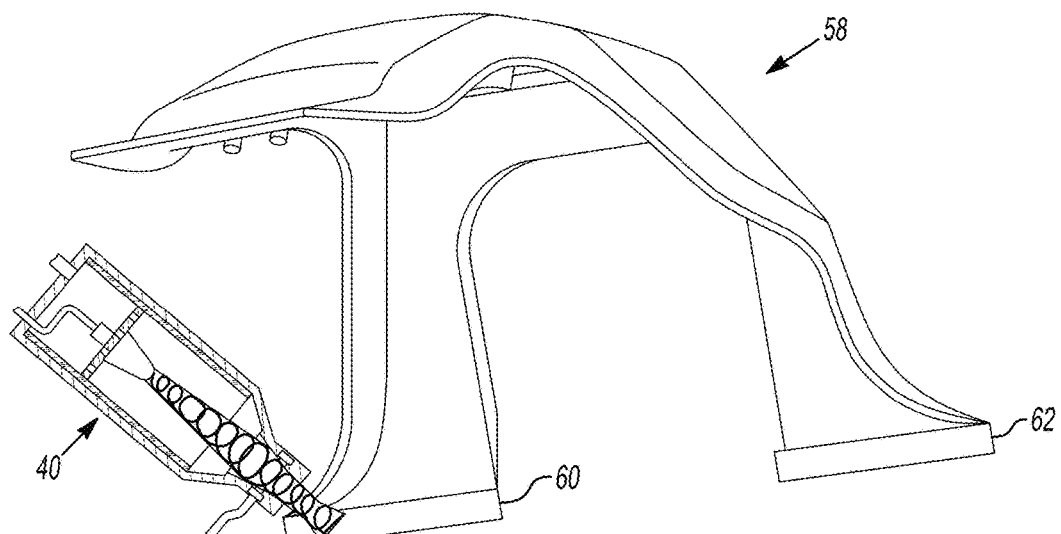
FIG. 4 is a perspective view of a plasma jet directed toward a first metal component having a localized area for cleaning, activating, and then coating with a polymer coating.

Referring to FIG. 4, a part 56 is shown after undergoing the plasma cleaning step 24 and coating step 26. The localized areas are identified by reference numerals 60 and 62. The plasma nozzle 50 of the plasma generator 40 is shown being directed to the localized area 60. The plasma generator 40 is preferably located on-line in the assembly facility where the parts are joined as sub-assemblies because surface activation created by the plasma may decrease over time.

Figure 5:
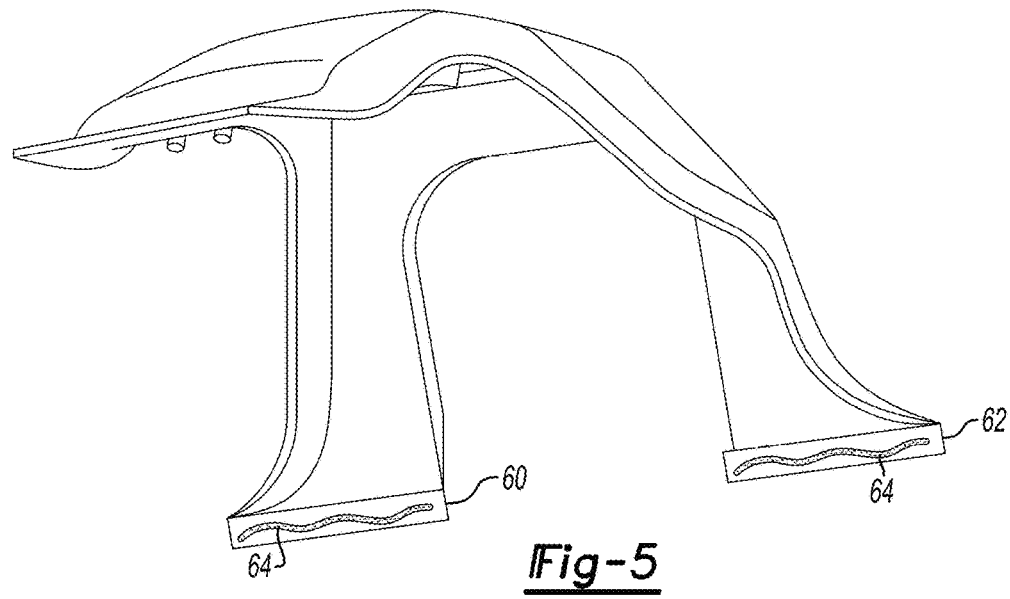
FIG. 5 is a perspective view of the first metal component of FIG. 4 showing adhesives being applied to the localized areas.
Figure 6:
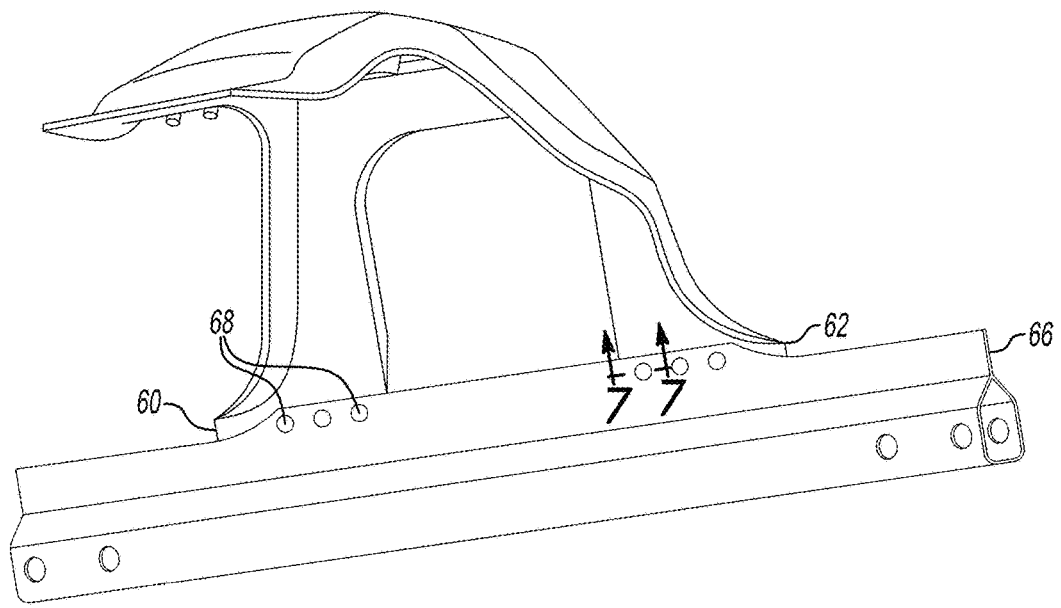
FIG. 6 is a perspective view of a second metal component being secured to the first metal component of FIG. 5 at the localized areas using self-piercing rivets.

Referring to FIGS. 5 and 6, an adhesive 64 is shown applied to localized areas 60 and 62. The joining adhesive 64 cooperates with fasteners 68, such as self-piercing rivets, to join the first part 56 to a second part 66, as shown in FIG. 6. The fasteners 68 mechanically fasten the first part 56 to the second part 66 at the localized areas 60 and 62 of the first part 56.

Figure 7:
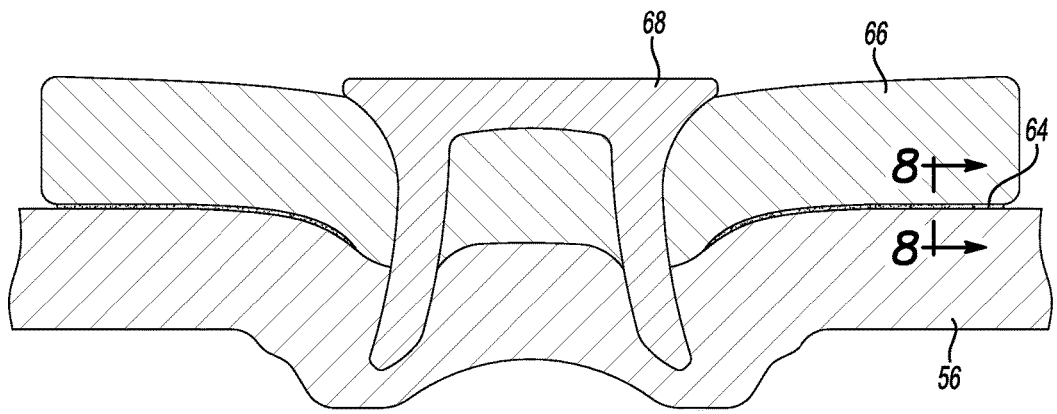
FIG. 7 is a cross-section view taken from lines 7-7 in FIG. 6 showing the adhesive reinforcing the joint by the fastener to secure the first part to the second part.

Referring to FIG. 7, a cross-section view is provided of the parts 58 and 66 joined by the self-piercing rivet 68 and adhesive 64. The self-piercing rivet 68 is driven through the second part 66 and into the first part 56, as shown. The rivet 68 may also be inserted in the opposite way. The fastening adhesive 64 is squeezed between the parts 56 and 58 to increase the strength of the joint between the parts. The polymerized silane film on the first part or the second part is not visible in FIG. 7.

Figure 8:
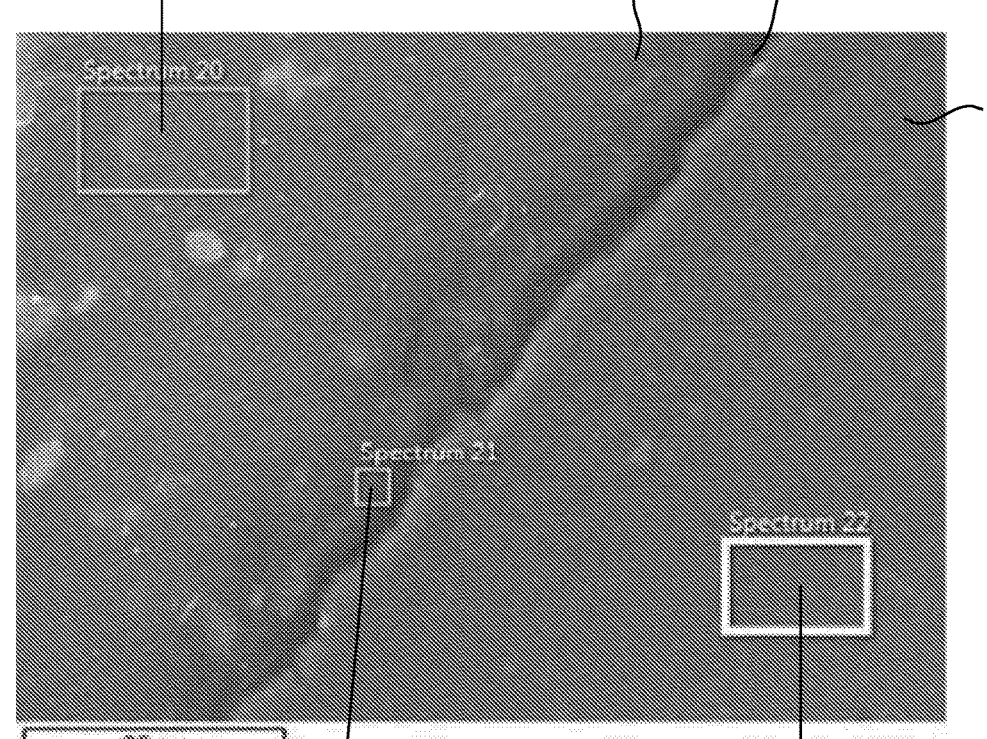
FIG. 8 is an electron diffraction spectrograph showing the presence of the polymer coating between the first and second metal components.

FIG. 8 is an electron diffraction spectrograph of a portion of the first part at one of the localized areas. The adhesive composition is shown as Spectrum 20 and the composition of the adhesive is shown in the spectrogram shown in FIG. 8A. The thin film of polymerized silane coating 70 adhering to the first part 56 is evidenced by the enhanced silicon (Si) deposit seen at Spectrum 21 is shown in the spectrogram shown in FIG. 8B. The composition of the metal alloy of the first part 56 is shown as Spectrum 22 is shown in the spectrogram shown in FIG. 8C. This spectrographic analysis establishes that a thin film of enhanced silicon 70 remains between the first part and the adhesive after assembling the parts together.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An assembly comprising:
    a first part;
    a plasma-enhanced vapor deposition film coating of an organosilicon composition applied to localized areas on the first part;
    a layer of adhesive applied to the film coating;
    a second part assembled to the first part; and
    a mechanical joint connecting the first part to the second part with the film coating and layer of adhesive disposed between the first part and the second part.

2. The assembly of claim 1 wherein the plasma-enhanced vapor deposition film coating is a hexamethyldisiloxane film.

3. The assembly of claim 2 wherein the hexamethyldisiloxane film includes exposed —OH groups that bond with the layer of adhesive.

4. The assembly of claim 1 wherein the mechanical joint is a self-piercing rivet.

5. The assembly of claim 1 wherein the plasma-enhanced vapor deposition film coating is applied to localized areas on the second part, and wherein the layer of adhesive is bonded to the film coating on the first part and the second part.

* * * * *